United States Patent Office 3,013,039
Patented Dec. 12, 1961

3,013,039
MANGANESE COMPOUNDS
Rogers F. Lambert, Baker, and James D. Johnston, Baton Rouge, La., assignors to Ethyl Corporation, New York, N.Y., a corporation of Delaware
No Drawing. Filed July 29, 1960, Ser. No. 46,079
11 Claims. (Cl. 250—429)

The present invention is concerned with the discovery of novel manganese nitrosyl compounds and their preparation.

An object of this invention is to provide and produce novel phosphine manganese nitrosyl compounds having unique and diverse utility. A more particular object of this invention is to provide phosphine manganese nitrosyl compounds which can be utilized as gasoline additives for internal combustion engines and particularly which improve the antiknock characteristics of gasoline, and otherwise contribute useful properties to the fuel, including the eliminating or reduction of wear, spark plug fouling and surface ignition. Other objects of this invention will be patently obvious from the discussion which follows.

These and other objects of this invention are accomplished by the provision of phosphine manganese nitrosyl compounds. The compounds of this invention exist in two forms, viz., phosphine manganese trinitrosyls and phosphine manganese tricarbonyl mono-nitrosyls.

The compound triphenylphosphine manganese tetracarbonyl has been reported previously (Hieber et al., Zeitschrift für Naturforschung, vol. 12, page 479 (1957). However, a sharp difference and distinguishing feature between the compounds of this invention and triphenylphosphine manganese tetracarbonyl is that the manganese tetracarbonyl compound has no antiknock qualities at all whereas the compositions of matter of this invention are endowed with these particular qualities. By way of example, the compound triphenylphosphine manganese tricarbonyl nitrosyl of this invention was tested in a standard clear—i.e., unleaded—test fuel (0.5 g. of manganese per gallon of fuel) and was found to raise the octane rating of the gasoline by one octane number. On the other hand, when the compound triphenylphosphine manganese tetracarbonyl, previously reported, was tested under the same conditions, it was found to have no antiknock qualities at all. Moreover the physical properties of the compositions of matter of this invention differ considerably from triphenylphosphine manganese tetracarbonyl previously reported. The compounds of the present invention are a great deal more volatile and gasoline soluble than the manganese tetracarbonyl compounds.

The compounds of one form of this invention, i.e., the manganese trinitrosyls, are triorganophosphine manganese trinitrosyl compounds wherein the organo groups are an alkyl, cycloalkyl, aralkyl, aryl or alkaryl. The compounds of the other form of this invention, i.e., the manganese tricarbonyl nitrosyls, are triorganophosphine manganese tricarbonyl nitrosyl compounds wherein the organo groups are alkyl, cycloalkyl, aralkyl, aryl or alkaryl. The preferred organo groups contain from 1 to 20 carbon atoms and more particularly from 1 to 10 carbon atoms. Particularly preferred compounds of this invention are triarylphosphine manganese tricarbonyl nitrosyls and triarylphosphine manganese trinitrosyls, especially triphenylphosphine manganese tricarbonyl nitrosyl and triphenylphosphine manganese trinitrosyl, and the corresponding tolyl and xylyl phosphine compounds.

Other examples of both forms of the novel compounds of this invention are trimethylphosphine manganese tricarbonyl nitrosyl, trimethylphosphine manganese trinitrosyl, triethylphosphine manganese tricarbonyl nitrosyl, triethylphosphine manganese trinitrosyl, tripropylphosphine manganese tricarbonyl nitrosyl, tripropylphosphine mangese trinitrosyl, tributylphosphine manganese tricarbonyl nitrosyl, tributylphosphine manganese trinitrosyl, tricyclohexylphosphine manganese trinitrosyl, tricyclohexylphosphine manganese tricarbonyl nitrosyl, tricycloheptylphosphine manganese trinitrosyl, tricycloheptylphosphine manganese tricarbonyl nitrosyl, tricumenylphosphine manganese trinitrosyl, triisopropylphosphine manganese tricarbonyl nitrosyl, tribenzylphosphine manganese tricarbonyl nitrosyl, tribenzylphosphine manganese trinitrosyl, tribiphenylphosphine manganese tricarbonyl nitrosyl, tribiphenylphosphine manganese trinitrosyl, ethylbis - bis - (diphenyl) - phosphine manganese trinitrosyl, phenyl-bis-(diethyl)phosphine manganese tricarbonyl nitrosyl, phenyl-bis(diethyl)phosphine manganes trinitrosyl, methyl-bis-(dibenzyl)phosphine manganese tricarbonylnitrosyl, methyl-bis-(dibenzyl)phosphine manganese trinitrosyl, and the like.

The compositions of matter of this invention can be produced by a number of processes, by far the most efficacious of which is the reaction between a triorganophosphine manganese tetracarbonyl compound and a nitrosylating agent, preferably nitric oxide. This reaction can be carried out over a range of temperatures and pressures, and is preferably conducted in an inert organic solvent.

The triorganophosphine manganese tetracarbonyl reactants which are useful in the preparation of the compounds of this invention are typified by triphenylphosphine manganese tetracarbonyl, triethylphosphine manganese tetracarbonyl, trimethylphosphine manganese tetracarbonyl, tricyclohexylphosphine manganese tetracarbonyl, tribiphenylphosphine manganese tetracarbonyl, and the like. The use of such phosphine manganese tetracarbonyl compounds in the reaction with nitric oxide is the preferred method of forming the compounds of this invention since this method results in a very smooth reaction and provides good yields of the desired products.

Desirable reaction temperatures in the above process range from about 40° to about 190° C. A more preferred temperature range, however, is from about 75° to about 120° C. It is usually more convenient to operate at the reflux temperature of the system and therefore the use of such inert solvents as hydrocarbons and ethers is advantageous. The reaction is best carried out at atmospheric pressure, but it will also operate at reduced pressure as well as at superatmospheric pressure. It is usually desirable to carry out the reaction in a moisture-free system.

The reaction time generally required for the preparation of these compounds ranges from several minutes to several hours depending upon the reactants and the conditions employed. Ordinarily, the reaction time ranges from about 30 minutes to about 10 hours.

There are other methods for producing the compounds of this invention. One method involves the reacting of an alkali metal manganese pentacarbonyl (e.g., sodium manganese pentacarbonyl) with a nitrosylating agent such as a nitrosyl halide (e.g., nitrosyl chloride) or sodium nitrite and then reacting the resulting product with a triorganophosphine to give the compounds of this invention. In this method an acid such as acetic acid is used in conjunction with the sodium nitrite or other alkali metal nitrite when such is used as a nitrosylating agent. Another method involves the reacting of alkali metal manganese tetracarbonyl triorganophosphine with a nitrosylating agent such as sodium nitrite or nitric oxide to give the desired products. Again, an acid such as acetic acid is used in conjunction with the alkali metal nitrite when such is used as the nitrosylating agent. Still another method involves reacting a triorganophosphine manganese tetracarbonyl halide with hydroxyl amine and anhydrous ammonia.

These novel and useful compounds can be more adequately and easily illustrated by the following examples in which all parts are by weight unless otherwise specified.

*Example I*

Nitric oxide was bubbled in excess through a refluxing solution of 18 parts of triphenylphosphine manganese tetracarbonyl in 300 parts by volume of benzene for 6 hours. At the end of the reaction period, the solvent was removed under reduced pressure. The dark colored residue was extracted with 200 parts by volume of boiling ethanol and filtered. The filtrate was cooled, causing 1.5 parts of triphenylphosphine manganese trinitrosyl to crystallize. This product was recrystallized from ethanol to give a dark green solid, melting at 128–130° C.

*Analysis.*—Calcd. for $C_{18}H_{15}MnN_3O_3P$: C, 53.09; H, 3.71; N, 10.32. Found: C, 52.99, 53.05; H, 3.82, 3.78; N, 10.38.

The residue from the ethanol extractant was recrystallized from a benzene-ethanol mixture to give 6 parts of triphenylphosphine manganese tricarbonyl nitrosyl, a red solid melting at 185–190° C.

*Analysis.*—Calcd. for $C_{21}H_{15}MnNO_4P$: C, 58.49; H, 3.51; N, 3.25. Found: C, 58.63, 58.47; H, 3.37, 3.58; N, 3.61. Molecular weight determinations in benzene indicate both compounds to be monomeric. Triphenylphosphine manganese trinitrosyl has nitrosyl absorption peaks in the infrared at 1790 cm.$^{-1}$ and 1680 cm.$^{-1}$. Triphenylphosphine manganese tricarbonyl nitrosyl has a nitrosyl peak at 1710 cm.$^{-1}$ and carbonyl peaks at 2015 cm.$^{-1}$, 1970 cm.$^{-1}$, and 1920 cm.$^{-1}$. The nitrosyl peaks are all in the range expected for nitrosyl ligands donating 3 electrons to the central metal.

*Example II*

Nitrosyl chloride (3 parts) was slowly added to a solution of 10 parts of sodium manganese pentacarbonyl in 200 parts by volume of tetrahydrofuran. Triphenylphosphine (11 parts) was then added and the solution was heated on a steam bath for one-half hour. Evaporation of the solvent left a red product which contained triphenylphosphine manganese tricarbonyl nitrosyl.

*Example III*

A sodium manganese pentacarbonyl solution was prepared by stirring a mixture of 10 parts of manganese pentacarbonyl, 200 parts by volume of tetrahydrofuran, and 300 parts of 1 percent sodium amalgam (NaHg) for 3 hours. Sodium nitrite (3.5 parts) was added to the solution followed by the slow addition of 20 parts by volume of 50 percent acetic acid solution. The solution was then stirred at room temperature for about 2 hours during which time it became dark red. Thereupon triphenylphosphine (13 parts) was added and the mixture was refluxed for 2 hours. The mercury was removed and the solvent was evaporated leaving a dark residue. Infrared analysis of this residue showed the presence of triphenylphosphine manganese trinitrosyl and triphenylphosphine manganese tricarbonyl nitrosyl.

*Example IV*

To a benzene solution of triphenylphosphine manganese tetracarbonyl bromide (10 parts) is added 100 parts by volume of a 5 perecnt methanolic solution of hydroxylamine and the mixture is saturated with anhydrous ammonia. The white solid which formed is removed by filtration and the filtrate is evaporated under reduced pressure. The residue is recrystallized to give a solid found by infrared to contain triphenylphosphine manganese trinitrosyl and triphenylphosphine manganese tricarbonyl mononitrosyl.

*Example V*

Triethylphosphine manganese tetracarbonyl (7 parts) in 50 parts by volume of toluene is placed in an autoclave under 5 atmospheres of nitric oxide pressure. The autoclave is then heated at 80° for 3 hours. The product which is obtained is a mixture of triethylphosphine manganese trinitrosyl and triethylphosphine manganese tricarbonyl mononitrosyl.

*Example VI*

Tricyclohexylphosphine manganese tetracarbonyl (10 parts) is reacted with an excess of nitric oxide in the presence of 500 parts of hexane. The system is heated for a period of 3 hours at reflux temperature in which nitric oxide is added rapidly through an inlet tube during the reaction period. The residue is a mixture of tricyclohexylphosphine manganese trinitrosyl and tricyclohexylphosphine manganese tricarbonyl mononitrosyl.

*Example VII*

Sodium manganese tetracarbonyl triphenylphosphine is prepared by rapidly stirring 10 parts of triphenylphosphine manganese tetracarbonyl in 500 parts by volume of pentane with 300 parts of 1 percent sodium amalgam for 2 hours. Solid sodium nitrite is added to the mixture followed by the very slow addition of 20 parts by volume of 50 percent acetic acid solution with continuous stirring. The mercury is removed and the pentane water mixture filtered to give the product which is triphenylphosphine manganese tricarbonyl mononitrosyl.

*Example VIII*

Nitrosyl chloride (3 parts) is allowed to slowly distill into a mixture of 10 parts of sodium manganese tetracarbonyl triphenylphosphine and 200 parts by volume of tetrahydrofuran. The mixture is stirred at room temperature for 2 hours and then the tetrahydrofuran is evaporated under reduced pressure. The residue is then recrystallized from a mixture of benzene and ethanol to give purified triphenylphosphine manganese tricarbonyl mononitrosyl.

The proportions of the reactants can be varied and are generally based on the amount of the phosphine manganese tetracarbonyl reactant used. Most usually, the nitrosylating agent is used in excess to obtain somewhat equal amounts of the products. In this connection it should be noted that the time of the reaction coupled with the amount of nitrosylating agent used will control the type of product produced. For example, where a small amount of nitrosylating agent is used, i.e., 1 mole of nitrosylating agent to 1 mole of a phosphine manganese tetracarbonyl reactant, in a short reaction time the product phosphine manganese tricarbonyl nitrosyl will be produced in greater amounts than the phosphine manganese trinitrosyl. On the other hand, where a large amount of the nitrosylating agent is reacted with a phosphine manganese tetracarbonyl reactant (e.g., in a ratio of 3:1), the product phosphine manganese trinitrosyl will be produced in larger proportions, especially when longer reaction times are used.

While the above examples indicate that an organic inert diluent is employed, it is to be understood that such is not absolutely essential. However, when used, it is desirable that these inert diluents exhibit solubility for one or all of the reactants. The inert diluents which are normally employed are the hydrocarbons and ethers. Among the hydrocarbons included are, for example, nonanes, octadecanes, hexanes, toluene, benzene, xylene, mesitylene, naphtha, petroleum ether, and the like. Typical ethers include tetrahydrofuran, diethyl ether, diamyl ether, dioxane, diethylene glycol dimethyl ether, diethylene glycol dibutyl ether, and the like.

The compounds of this invention have utility as antiknock compounds when blended with petroleum hydrocarbons mixtures suitable for use in spark ignition internal combustion engines. These compounds have the advantageous properties of concurrently preventing spark plug fouling and surface ignition, and therefore provide a number of benefits when used as gasoline additives. The fuels in which the compounds of this invention are used can be unleaded or they can contain the usual amounts of alkyllead antiknocks, such as tetraethyllead, tetramethyllead, etc. Manganese concentrations of from about 0.05 to about 2 grams per gallon give best results. Another use for the compounds of this invention is in the field of agriculture for use as herbicides, fungicides, and the like.

Having thus described the compositions of matter and processes for making them, it is not intended that they be limited except as set forth in the following claims.

We claim:

1. triorganophosphine manganese tricarbonyl nitrosyl compounds wherein the organo groups are selected from the group consisting of alkyl, cycloalkyl, aralkyl, aryl and alkaryl.

2. Triorganophosphine manganese trinitrosyl compounds wherein the organo groups are selected from the group consisting of alkyl, cycloalkyl, aralkyl, aryl and alkaryl.

3. Triarylphosphine manganese tricarbonyl nitrosyl.

4. Triarylphosphine manganese trinitrosyl.

5. Triphenylphosphine manganese tricarbonyl nitrosyl.

6. Triphenylphosphine manganese trinitrosyl.

7. A process for producing phosphine manganese nitrosyl compounds comprising reacting a phosphine manganese tetracarbonyl with nitric oxide.

8. The process of claim 7 wherein the phosphine manganese tetracarbonyl is a triarylphosphine manganese tetracarbonyl.

9. The process of claim 7 wherein the phosphine manganese tetracarbonyl is triphenylphosphine manganese tetracarbonyl.

10. The process of claim 7 wherein the reaction is conducted at a temperature of from about 75° C. to about 120° C.

11. The process for producing triphenylphosphine manganese nitrosyl compound comprising reacting triphenyl phosphine manganese tetracarbonyl with nitric oxide in benzene at the reflux temperature of the reaction mixture.

No references cited.